(No Model.)

C. H. PETTAY.
LINE TIGHTENER.

No. 449,085. Patented Mar. 24, 1891.

Witnesses
F. H. Stuart
C. E. Humphrey

Inventor
Charles H. Pettay,
By his Attorney
C. P. Humphrey

UNITED STATES PATENT OFFICE.

CHARLES H. PETTAY, OF AKRON, OHIO, ASSIGNOR TO WILLIAM W. ALEXANDER, OF SAME PLACE.

LINE-TIGHTENER.

SPECIFICATION forming part of Letters Patent No. 449,085, dated March 24, 1891.

Application filed March 22, 1890. Serial No. 344,999. (No model.)

*To all whom it may concern:*

Be it known that I, CHARLES H. PETTAY, a citizen of the United States, residing at Akron, in the county of Summit and State of Ohio, have invented a certain new and useful Improvement in Line-Tighteners, of which the following is a specification.

The object of my invention is to provide an improved appliance for tightening light flexible lines, as clothes-lines, between their points of attachment as they become slack.

My invention consists in certain novel and peculiar construction and combination of parts, as hereinafter described, and specifically pointed out in the claims, reference being had to the accompanying drawings, which constitute a part of this specification.

Figure 1:
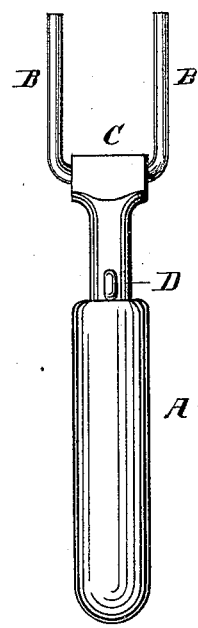
Figure 2:
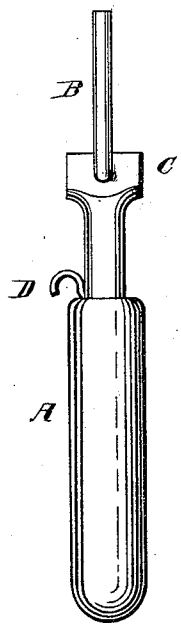

In the accompanying drawings, in which similar letters of reference indicate like parts, Figure 1 is a front elevation of the line-tightener; Fig. 2, a side elevation, and Fig. 3 a front elevation showing the line wound about it and locked.

A is a stick of wood or similar material, its lower part shaped to afford a convenient handle for the hand to grasp, above which it is reduced to form a roller for the line, and terminates in an enlarged head C, this head and the shoulder of the handle serving as fenders to keep the line on the reduced portion. At one side of the reduced portion, and preferably near the bottom, as shown, is a downwardly-turned hook D, and passing transversely through the head C is a metallic rod B, its ends turned at a right angle parallel with the axis of the stick A and with each other.

Figure 3:
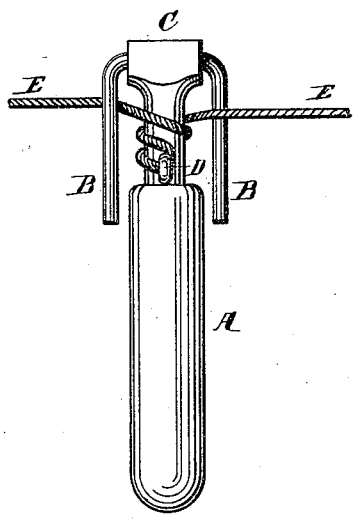

In operation the ends of the rod B are turned upward, as shown in Figs. 1 and 2. The hook D is then drawn over the slack line E and the stick A revolved by hand, thereby winding the line E about its reduced portion below the head until the line is sufficiently tightened, when the ends of the wire B are turned down and the line in one direction swung under and in the other above its ends, thereby locking it from unwinding, as shown in Fig. 3.

I claim—

1. A line-tightener for light flexible lines, consisting of a handle having a reduced portion and a head in alignment, a hook projecting from the reduced portion, and a rod passing transversely through said head and bent at each end substantially parallel with the axis of the handle, substantially as shown and described.

2. The combination, with the handle A, having the reduced portion and head C, of the hook D and bent rod B, all constructed and arranged, as shown, and for the purpose specified.

In testimony that I claim the above I hereunto set my hand.

CHARLES H. PETTAY.

In presence of—
C. E. HUMPHREY,
C. P. HUMPHREY.